United States Patent [19]

Gannett et al.

[11] 3,726,497
[45] Apr. 10, 1973

[54] AIRCRAFT CONTROL HANDLES

[75] Inventors: James R. Gannett, Redmond; James W. McKee, Henry E. Ronberg, both of Belleve, John D. Warner, Seattle, all of Wash.

[73] Assignee: The United States of America as represented by the Administrator of the Federal Aviation Administration.

[22] Filed: Jan. 15, 1971

[21] Appl. No.: 106,753

[52] U.S. Cl. .............................................. 244/83 R
[51] Int. Cl. .............................................. B64c 13/06
[58] Field of Search .................... 244/83 R, 83 B, 84, 244/75

[56] References Cited

UNITED STATES PATENTS

| | | | |
|---|---|---|---|
| 1,820,906 | 9/1931 | Bowers | 244/84 |
| 2,579,265 | 12/1951 | Lander et al. | 244/83 R |
| 2,345,120 | 3/1944 | Haseloff et al. | 244/83 R X |
| 2,566,526 | 9/1951 | LeCarme | 244/83 R |
| 2,618,447 | 11/1952 | LeCarme | 244/83 R |
| 2,628,045 | 2/1953 | Schmidt | 244/83 R |
| 2,685,422 | 8/1954 | Hammond et al. | 244/83 R |
| 3,119,583 | 1/1964 | Gibson | 244/83 R |
| 3,507,166 | 4/1970 | Nix | 244/83 R X |

Primary Examiner—Milton Buchler
Assistant Examiner—Carl A. Rutledge
Attorney—Glenn Orlob and Kenneth W. Thomas

[57] ABSTRACT

Pilot control means for an aircraft cockpit comprising, a pair of aircraft control handles projecting out from the cockpit instrument panel and being mounted to a horizontal shaft which through interconnected linkage and crank means, provides for aircraft attitude control such that pitch control is provided by pulling backward or pushing forward either or both of the handles and roll control is provided by rotating either or both handles to the right or left about their respective horizontal shafts.

12 Claims, 3 Drawing Figures

PATENTED APR 10 1973

INVENTORS,
JAMES R. GANNETT
JAMES W. McKEE
HENRY E. RONBERG
JOHN D. WARNER

BY

AGENT

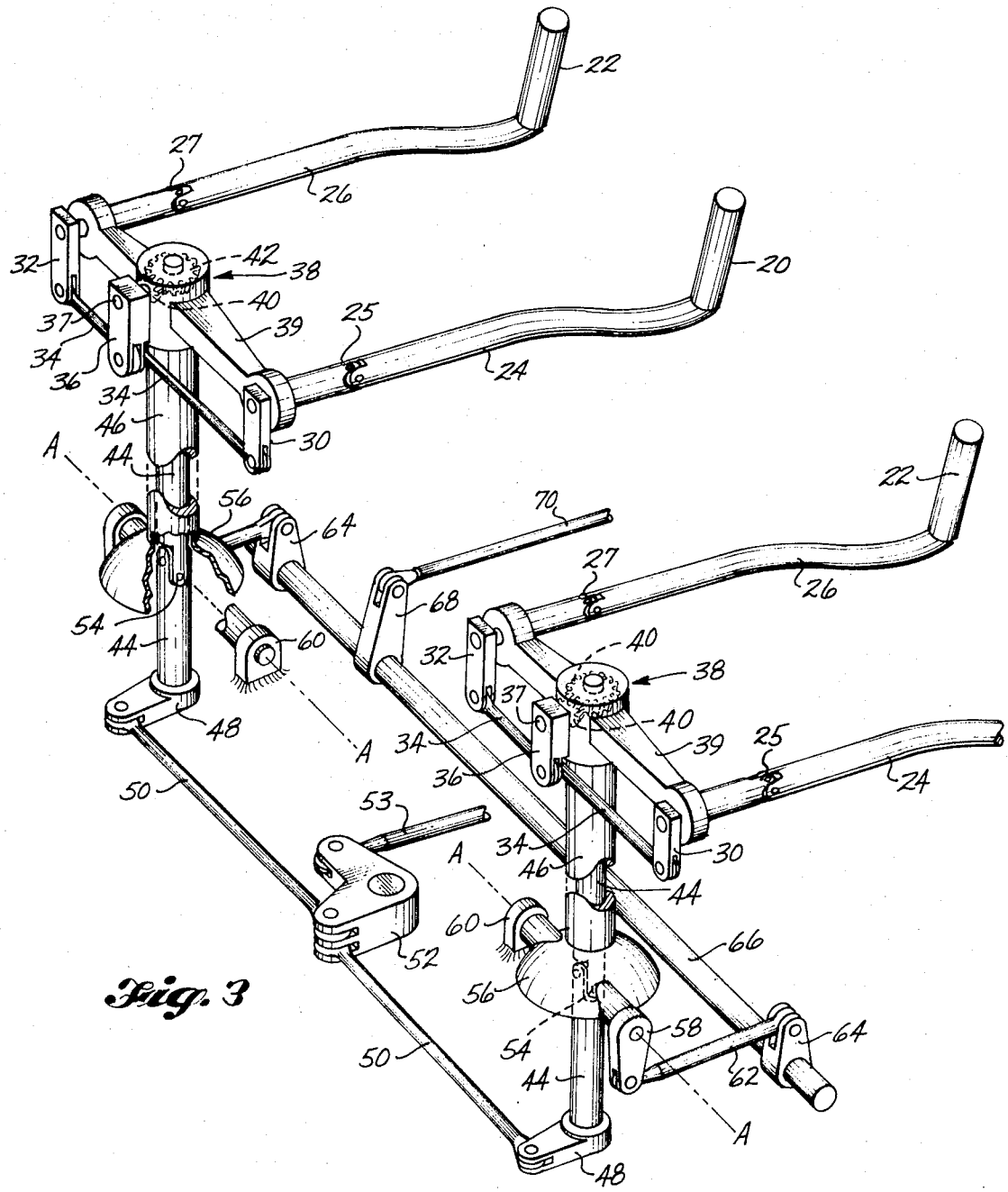

AIRCRAFT CONTROL HANDLES

The invention described and claimed herein resulted from work done under U.S. Government Contract FA-SS-67-3, and the U.S. Government has an irrevocable, nonexclusive license to practice and have practiced the invention claimed herein, including the unlimited right to sublicense others to practice and have practiced the claimed invention for any purpose whatsoever.

SUMMARY OF THE INVENTION

The invention relates to a twin handle primary flight controller for an aircraft pilot control system and more particularly to a pair of control rods with attached offset handles installed on the instrument panel in the flight deck of an aircraft for aircraft pitch and roll control.

The air of panel mounted pitch and roll controllers are a replacement for the conventional control column and wheel, and their utilization increases the usable panel area by completely opening up the prime instrument panel spaced directly in front of the pilot to both his view and access while increasing pilot comfort. Also, the floor and seat interferences to the pilot's egress are cleared.

Current wheel and column controls in transport aircraft obstruct a large portion of the limited space available for instruments vital to the operation of high performance transport aircraft operating under all weather flight conditions.

Advanced instrument panel display concepts that are being developed such as large screen pictorial navigation or map displays, are becoming a part of flight deck instrumentation which should be located in the prime area down the center and directly in front of the pilot's main instrument panel below the primary attitude indicator. Such a display in this highly desirable location is largely hidden from the pilot's view by the conventional control column and wheel used in many large military and commercial aircraft. The yoke type wheel on a short column used on some known aircraft, improves the instrument panel visibility somewhat but it has the further disadvantage in that it does not provide unrestricted visibility to the floor, nor does it materially benefit map display visibility.

Some of the advanced concepts also include control and display consoles located directly in front of the pilot between his legs. This layout is often used in fighter aircraft, and is desired in larger aircraft with the addition of new avionic systems designed to improve overall operating efficiency and decrease pilot workload. Such a console is also not possible with the conventional column arrangement.

Further, the column and wheel combination is detrimental to pilot comfort in that it constrains leg room and necessarily creates a slot in the seat for the full-aft position of the control column. This slot makes the forward edge of the seat uncomfortable especially after the seat is worn from repeated use.

One of the objects of the present invention is to provide unrestricted forward vision to the center of the pilot's instrument panel.

Another object is to provide unrestricted downward visibility between the pilot's feet down to the floor.

Another object is to eliminate visual obscuration and reach obstruction of the instrument panel directly in front of the pilot.

Another object is to improve access to and egress from the pilot's seat by clearing the cockpit floor area of the conventional wheel and column control.

A further object is to eliminate the slot in the pilot's seat cushions which are a source of discomfort as the seat wears.

One of the advantages of the present invention is that it provides means for making available the prime area down the center of the pilot's main instrument panel for the incorporation of pictorial navigation displays and other advanced instrumentation displays that are certain to become a part of advanced aircraft flight deck instrumentation.

A further advantage is that it provides a space between the pilot's feet and down to the floor for additional instruments and controls in addition to providing a cleared area for the pilot's egress.

Another advantage is that the design of the handles provides a rotating motion of the hands and wrists similar to that of a pair of laterally spaced apart control wheels.

There is also an advantage in that the controllers have reasonable travel to insure some degree of mechanical advantage and proprioceptive feedback.

These advantages and objects of the present invention, as well as others, will be more clearly understood from the following description when read with reference to the accompanying drawings wherein:

BRIEF DESCRIPTION OF THE DRAWINGS

FIG. 3 is a perspective view from a rearward aspect of a three dimensional schematic of the cockpit control system arrangement and operation.

DESCRIPTION OF THE PREFERRED EMBODIMENTS

Figure 1:
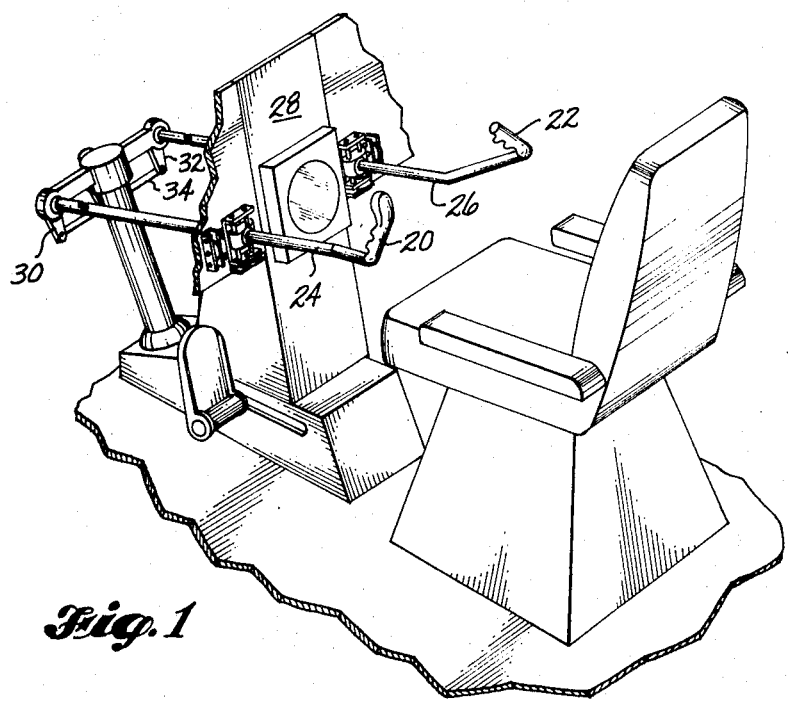
FIG. 1 is a perspective view of the panel mounted dual control handles of the present invention in an aircraft cockpit arrangement.
Figure 2:
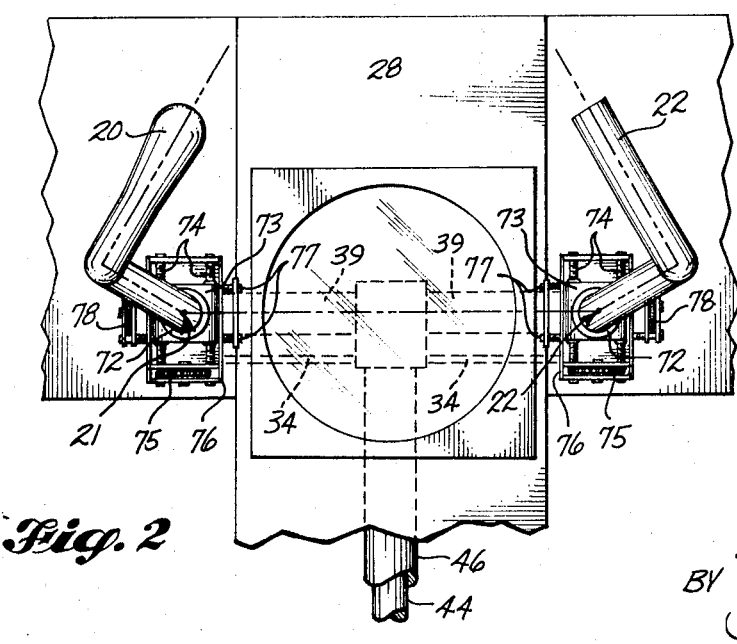
FIG. 2 is a front view of the instrument panel more clearly depicting the arrangement of the dual offset control handles with their vertical and horizontal adjusting means in combination with a visual instrument display positioned between them.

FIGS. 1 through 3 show the installation of the panel mounted controllers comprising; two hand grips, 20 left and 22 right, which are similar except that 20 contains the pitch trim, microphone switches and other optional switches, not shown. The pair of hand grips 20 and 22 are of the pistol grip type handle and are fixedly attached with an offset to one end of each rod 24 and 26 respectively; which rods slide fore and aft through the instrument panel 28.

Airplane roll control input is provided by separately rotating either one of the handles or by rotating both of the handles in unison about their own rod axis. Rotation of the handles 20 and 22 about their control rods 24 and 26 respectively, through universal joints 25 and 27, operate cranks 30 and 32 which are mounted to the control column 38 by the control column trunnion 39. The cranks 30 and 32 are interconnected by rods 34 which coordinate the rotation of the two handles. The rods 34 are also connected to a crank arm 36 mounted centrally on the control column 38 which responds to the roll control input from either or both of the hand grips.

Movement of crank arm 36 about its pivotal connection 37, rotates a set of bevel gears 40 and 42 which turn torque shaft 44 coaxially within the tubular upright shaft 46 of control column 38. The lower end of torque shaft 44 is fixedly connected to crank arm 48 and through interconnecting rod 50 operates the bellcrank 52 and the lateral or roll control input rod 53. Turning the handles 20 and 22 clockwise provides right roll control input and conversely turning them counterclockwise provides left roll.

Airplane longitudinal or pitch control input is provided by pulling or pushing on either or both of the control handles 20 and 22. Movement of the control handles into or out of the instrument panel 28, tilts the control column 38 about a structural pivot axis A—A. The base of the vertical tube 46 of control column 38 is fixedly attached to and terminates in a bell housing 56 which housing is pivotally mounted at 60 to aircraft structure for tilting movement about axis A—A. The bell housing 56 has an arm 58 fixed thereto for pivotal movement also about axis A—A. Fore and aft movement of the control column 38 rotates arm 58 about axis A—A and through link 62, torque arm 64, torque shaft 66, torque arm 68 and rod 70, imparts the longitudinal or pitch control input to the aircraft control system. The universal joint 54, interconnecting the upper and lower sections of the torque tube 44, is in axial alignment with the control column tilting axis A—A and therefore movement of control column can be made without imparting rotary motion to torque shaft 44. Pulling the handles provides airplane pitch up and pushing provides pitch down control.

Vertical and horizontal adjustability is provided to the two control handles 20 and 22 and their control rods 24 and 26 respectively, which are supported in the instrument panel 28 by slide bearings 72. These bearings are mounted in housings or bearing support blocks 73 which are adjustable vertically by a thumb driven gear wheel 75 rotatably engaging a threaded pair of parallel shafts 74 which are threadedly engaged with the bearing block 73. Horizontal or lateral adjustability is provided by further mounting the vertical adjustability mechanism within a housing 76 and further supporting the housing on a threaded pair of parallel horizontal shafts 77 which are rotatably driven by a thumb drive gear wheel 78 for adjusting the control handles laterally.

Vertical adjustability of the control handles provides leg clearance for different size pilots and the lateral adjustability provides greater degree of comfort by increasing the lateral separation of the handles from that realized by the conventional wheel and column arrangement.

FIG. 2 shows the handle grips 20 and 22 offset from the longitudinal rotational axes 21 and 22 of control rods 24 and 26 respectively. Each of the handle grips are laterally offset from their longitudinal rotational axes 21 and 22 outward from the space between the control rod members in such manner that each hand and wrist of the pilot rotate about each rod rotational axis similar in rotation motion to that of dual control wheels. The handle geometry is sized to provide sufficient radius and angular travel so that the control force levels are at or below those associated with the conventional control wheel. More particularly, the handles are sized for enough torque input to operate the control system, e.g., approximately fourteen inch pounds. The reason for the laterally spaced offset and the toed-in position of the handles is that in addition to the moment arm advantage, the position of the wrists are more comfortable in that the resultant control input includes some arm muscle control in addition to wrist motion. If the pivot for roll control were axially aligned with the rotational axes of the control rods rather than offset and interior thereof as with the conventional control wheel, a different type of control coordination would be required for roll action in addition to the fact that with such an arrangement, there is always the possibility of an inadvertent roll input due to lateral accelerations of the cockpit. Further, a wrist torque type control handle may not be acceptable from an operational standpoint because of fatigue in the wrist muscles and also in the event of a control system jam, there is less capability of overcoming it due to the decrease in moment arm. By employing a laterally offset handle design similar to the one shown in FIG. 2, the problems of side acceleration induced roll and also of excessive torque roll input requirements to the pilot's wrists can be alleviated. For this handle arrangement the pivot point is not affected by the lateral positioning of the control shafts and bears the same relation to the individual hand positions as exists with the conventional wheel. The difference lies in the separation of the handles thereby creating dual pivot points. Further, it is believed, that removing the inboard handle and flying only with the use of the outboard hand would not be acceptable for normal commercial piloting operations for reasons of fatigue and the satisfactory performance of other functions.

While the invention has been disclosed with reference to a preferred embodiment, it is to be understood that modifications and changes which become obvious to a person skilled in the art as a result of the teachings hereof will be encompassed by the following claims:

We claim:

1. A pilot operated flight control means for an aircraft control system comprising: an upright instrument panel mounted in front of the pilot; two control members supported thereby and extending forwardly from the panel in spaced apart relationship to provide the pilot with unrestricted forward vision between them to the instrument panel; said control members being connected to the aircraft control system for providing pitch control input by pulling backward or pushing forward either or both of the members and roll control input by rotating either or both of the members; a pilot's control handle grip mounted to each control member and being radially offset from the roll control rotational axes of the control members whereby a more preferred arm muscle control input is effected as opposed to a pure wrist torque input for less pilot fatigue; and means carried by the instrument panel for providing vertical adjustability of the two control members in the instrument panel to accommodate the pilot's leg clearance.

2. The combination set forth in claim 1 including means carried by the instrument panel for providing horizontal adjustability of the two control members in the instrument panel to accommodate the pilot's lateral arm separation.

3. The combination set forth in claim 1 wherein the means for providing vertical adjustability comprises guide means mounted in the instrument panel; said two control members being slidably mounted in the guide means for fore and aft movement through the instrument panel; said guide means providing a range of vertical adjustment for the two control members such that when the control members are actuated to slide fore and aft through the instrument panel, their interference with the pilot's legs is eliminated.

4. The combination set forth in claim 1 including guide means mounted in the instrument panel; said two control members being rotatably mounted in the guide means for rotational movement through the instrument panel; said guide means providing a range of horizontal adjustment for the two control members such that when the pilot's control handle grips are actuated to rotate the control members through the instrument panel, their degree of laterally spaced apart relationship accommodates the pilot's arm spacing.

5. A pilot operated flight control means for an aircraft control system comprising: an instrument panel mounted in front of the pilot; two control rod members supported thereby and extending longitudinally from the panel toward the pilot in a laterally spaced apart relationship and terminating in an offset outward from the space between the control rod members to provide the pilot with unrestricted forward vision between them to the instrument panel; a pilot's hand grip mounted to each control rod member towards the outer end of the offset; each of said control rod members having a longitudinal axis and being connected to the aircraft control system for providing pitch control input by longitudinally pulling backward or pushing forward either or both hand grips about the longitudinal axes of the control rod members; and means carried by the instrument panel for providing vertical adjustability of the two control members in the instrument panel to accommodate the pilot's leg clearance.

6. The combination set forth in claim 5 including means carried by the instrument panel for providing horizontal adjustability of the two control members in the instrument panel to accommodate the pilot's lateral arm separation.

7. The combination set forth in claim 5 wherein the means for providing vertical adjustability comprises guide means mounted in the instrument panel; said two control members being slidably mounted in the guide means for fore and aft movement through the instrument panel; said guide means providing a range of vertical adjustment for the two control members such that when the control members are actuated to slide fore and aft through the instrument panel, their interference with the pilot's legs is eliminated.

8. The combination set forth in claim 5 including guide means mounted in the instrument panel; said two control members being rotatably mounted in the guide means for rotational movement through the instrument panel; said guide means providing a range of horizontal adjustment for the two control members such that when the pilot's control handle grips are actuated to rotate the control members through the instrument panel, their degree of laterally spaced apart relationship accommodates the pilot's arm spacing.

9. A pilot operated flight control means for an aircraft control system comprising: an instrument panel mounted in front of the pilot; two control members extending longitudinally out from the panel and laterally separated throughout their length to provide the pilot with unrestricted forward vision between them to the instrument panel; an arm integral with each of the control members and projecting laterally outward from between the members; a pilot's control handle grip mounted to the arm of each control member; said control members being connected to the aircraft control system for providing pitch control input by pulling backward or pushing forward either or both of the handles, and roll control input by rotating either or both of the control members with the handles; and means carried by the instrument panel for providing vertical adjustability of the two control members in the instrument panel to accommodate the pilot's leg clearance.

10. The combination set forth in claim 9 including means carried by the instrument panel for providing horizontal adjustability of the two control members in the instrument panel to accommodate the pilot's lateral arm separation.

11. The combination set forth in claim 9 wherein the means for providing vertical adjustability comprises guide means mounted in the instrument panel; said two control members being slidably mounted in the guide means for fore and aft movement through the instrument panel; said guide means providing a range of vertical adjustment for the two control members such that when the control members are actuated to slide fore and aft through the instrument panel, their interference with the pilot's legs is eliminated.

12. The combination set forth in claim 9 including guide means mounted in the instrument panel; said two control members being rotatably mounted in the guide means for rotational movement through the instrument panel; said guide means providing a range of horizontal adjustment for the two control members such that when the pilot's control handle grips are actuated to rotate the control members through the instrument panel, their degree of laterally spaced apart relationship accommodates the pilot's arm spacing.

* * * * *